United States Patent [19]

Siefert et al.

[11] Patent Number: 4,851,025
[45] Date of Patent: Jul. 25, 1989

[54] PROCESS FOR PRODUCING A PLANAR OPTICAL WAVEGUIDE

[75] Inventors: Wolfgang Siefert, Sertoriusring; Ralf Kersten, Am Konigsberg, both of Fed. Rep. of Germany

[73] Assignee: Schott Glaswerke, Fed. Rep. of Germany

[21] Appl. No.: 127,477

[22] Filed: Dec. 2, 1987

[30] Foreign Application Priority Data

Dec. 3, 1986 [DE] Fed. Rep. of Germany ....... 3641285

[51] Int. Cl.$^4$ .................. C03B 8/04; C03C 23/00; C03C 15/00
[52] U.S. Cl. .......................... 65/31; 65/3.12; 65/18.2; 65/60.2; 65/DIG. 15; 65/DIG. 16; 156/655; 156/657
[58] Field of Search ................ 65/18.2, 31, 3.11, 3.12, 65/60.2, DIG. 15, DIG. 16; 156/655, 657, 663; 372/45, 46; 350/96.12, 320; 427/162, 163, 166

[56] References Cited

U.S. PATENT DOCUMENTS

| | | | |
|---|---|---|---|
| 4,179,189 | 12/1979 | Kaminow et al. | 350/96.12 |
| 4,395,270 | 7/1983 | Blankenship | 65/3.12 |
| 4,549,891 | 10/1985 | Plummer | 65/3.12 |
| 4,652,290 | 3/1987 | Cho | 65/60.2 |
| 4,765,819 | 8/1988 | Kersten | 65/18.2 |

FOREIGN PATENT DOCUMENTS

| | | |
|---|---|---|
| 2901092 | 7/1979 | Fed. Rep. of Germany . |
| 3047589 | 9/1981 | Fed. Rep. of Germany . |
| 59-54635 | 3/1984 | Japan . |
| 2012983 | 8/1979 | United Kingdom . |
| 2066805 | 7/1981 | United Kingdom . |

Primary Examiner—Kenneth M. Schor
Attorney, Agent, or Firm—Wegner & Bretschneider

[57] ABSTRACT

Planar single-mode optical waveguides which can conduct light with defined polarisation have so far been embedded in, for example, a cladding made from crystalline $LiNbO_3$. The crystalline structure of the cladding produces disadvantageous properties such as the fact that the birefringence depends on the geometric profile of the guide, relatively high optical loss, poor fibre coupling, birefringence rigidly fixed by material constants, and a costly manufacturing process. The new process results in an optical waveguide in which both the cladding and the actual guide itself are made of glass with a certain composition, thereby avoiding the disadvantages stated. With the help of a non-isothermal plasma CVD process a light-guiding core region (1) is surrounded on a substrate (4) by cladding layers (2, 2') and a cladding region (3, 3'), the thermal coefficient of longitudinal expansion of the cladding region (3, 3') differing markedly from that of the two homogeneous cladding layers (2, 2'). The core region has either a higher or approximately the same refractive index as the cladding region. Use of the optical waveguide is as a polarisation-receiving or polarising single-mode optical waveguide.

9 Claims, 1 Drawing Sheet

PROCESS FOR PRODUCING A PLANAR OPTICAL WAVEGUIDE

BACKGROUND OF THE INVENTION

The present invention relates to a process for producing a planar optical waveguide for guiding light with defined polarisation, by depositing, on a substrate, thin, vitreous layers from the gas phase in accordance with a scheme which enables a given refractive index profile of the layers to be produced, thereby forming a light-guiding core region and cladding layers adjoining said core region, light-guiding strips subsequently being produced from these layers by masking and etching away the unmasked regions.

Planar single-mode optical waveguides for guiding light with defined polarisation have important applications as the basic module in integrated optical arrangements for sensor systems and for single-mode fibre communications, especially for transmitting coherent light with a preferred plane of polarisation. One specific example where such optical waveguides are used is the gyroscope.

Until now, waveguides chiefly constructed from $LiNbO_3$ crystals (lithium niobate) have been used in the manufacture of planar single-mode optical waveguides, which can conduct light with defined polarisation (polarisation-receiving or polarising optical waveguides), the light-guiding core of said crystals having been produced by diffusion of titanium into a channel formed in a $LiNbO_3$ crystal and by the exchange of protons over a short stretch of the light-guiding region of $Li^+$ for $H^+$ (Electronic Letters, Feb. 1984, Vol. 20, No. 3, p. 128). The principle of operation of such integrated optical polarisers relies on the fact that the refractive indices of the $LiNbO_3$ crystal making up the cladding of the optical waveguide differ in the direction of the various crystal axes (birefringence).

Polarising or polarisation-receiving single-mode optical fibres are also produced by stress-induced birefringence. This stress-induced birefringence is caused by the action of different compressive and/or tensile stresses on the core of the single-mode waveguide from opposite directions, and is responsible for the fact that in single-mode waveguides the two mutually perpendicular propagation modes (planes of polarisation) do not become coupled together.

The foregoing optical waveguides, embedded in a $LiNbO_3$ crystal have various more or less serious disadvantages:

(a) the crystalline structure of the $LiNbO_3$ determines the direction of the preferred polarisation; as a result of this, waveguide curvatures can alter or even completely nullify the birefringence; this severely limits the potential usable region;

(b) the transmitted light undergoes relatively great attenuation;

(c) the relatively great difference in the refractive index between the $LiNbO_3$ crystal and the light-conducting single-mode waveguide to be coupled thereto causes problems in fibre coupling, in particular high reflection at the interface of the $LiNbO_3$ crystal and the optical waveguide, as well as poor field adaptation;

(d) one particularly serious disadvantage is the fact that the material constants rigidly determine the birefringence;

(e) the method for producing integrated optical polarisers of this type is very costly and laborious.

SUMMARY OF THE INVENTION

The object of the present invention is therefore a process for producing a planar single-mode optical waveguide which only conducts light with defined polarisation, wherein the direction of polarisation can be freely fixed, the optical waveguide exhibits low optical attenuation, is quick and simple to manufacture, allows ease of fibre coupling, and birefringence is not affected by the geometric profile of the optical waveguide.

This object is achieved by a process of the type mentioned in the introduction, in that after the formation of said light-conducting strip waveguides a vitreous cladding region adjoining these strip waveguides on both sides is deposited, that perpendicular to the substrate surface the dimensions of the cladding region and of the light-conducting strip waveguide are roughly equal, and that the thermal coefficient of longitudinal expansion of said cladding region is markedly different from the thermal coefficient of longitudinal expansion of the two similar cladding layers.

DETAILED DISCUSSION OF THE INVENTION

In accordance with the present invention, the stress-induced birefringence required to maintain polarisation and to stabilise the two modes propagating in mutually perpendicular directions in the case of single-mode optical waveguides is achieved by virtue of the fact that tensile stresses and/or compressive stresses act perpendicularly on the core from the direction of the similar cladding layers and/or the cladding region, on the core region of the present optical waveguide which is capable of conducting light with definite polarisation.

The signs (tension or pressure) of the stresses acting on the core depend on the interaction of the linear thermal coefficients of expansion of the materials of the core region, of the two similar cladding layers, and of the cladding region. This is discussed in more detail in the working examples below.

Advantageous embodiments of the present invention are achieved with the features of the subsidiary claims.

In addition, by suitable choice of the refractive indices of the core region, of the similar cladding layers and of the cladding region, the characteristics of the optical waveguide of the invention can be systematically preset in respect of the polarisation-receiving action on the propagation of the light (single-mode optical guidance).

This is because if, in addition to a different coefficient of expansion, the materials of the two similar cladding layers and of the cladding region also exhibit lower refractive indices than the material of the core region, then the corresponding optical waveguide has a polarisation-receiving action for the two modes propagated perpendicular to one another and the two planes of polarisation (modes) can each be conducted separately, independent of the other.

If although the material of the two similar cladding layers or of the cladding region exhibits different coefficients of expansion it does however have roughly the same refractive index as the core region, then at the interface formed by the materials of roughly identical refractive indices there is a coupling out of the optical mode incident to said interface; the optical waveguide so produced therefore has a polarising effect, and only one plane of polarisation (mode) of the light being propagated in single mode is transmitted.

In accordance with the present invention, the vitreous layers from which the optical waveguide is constructed and the cladding region can be deposited using a non-isothermal plasma CVD process.

The glasses that are deposited to produce the optical waveguide of the invention may equally well be oxide glasses, fluoride glasses or chalcogenide glasses. However, the glasses used in any one application must always be of the same type.

Chalcogenide glasses, for example, offer the advantage that they can also be employed to transmit light in the infrared wavelength range.

Inexpensive quartz glass can be used as the substrate material in all the possible and conceivable embodiments of the present invention.

When producing optical waveguides of the invention having especially low optical attenuation the thickness of the cladding layer between the substrate and the core region is selected to be at least large enough that the propagating light cannot interact with the substrate, since otherwise the propagating light could be greatly attenuated. This also reduces the cost of manufacturing the optical waveguide, because the substrate material does not need to be made from particularly low-loss material.

BRIEF DESCRIPTION OF THE DRAWINGS

The invention is explained in more detail below with the aid of two working examples referring to the drawing, in which.

WORKING EXAMPLE 1

Figure 1:
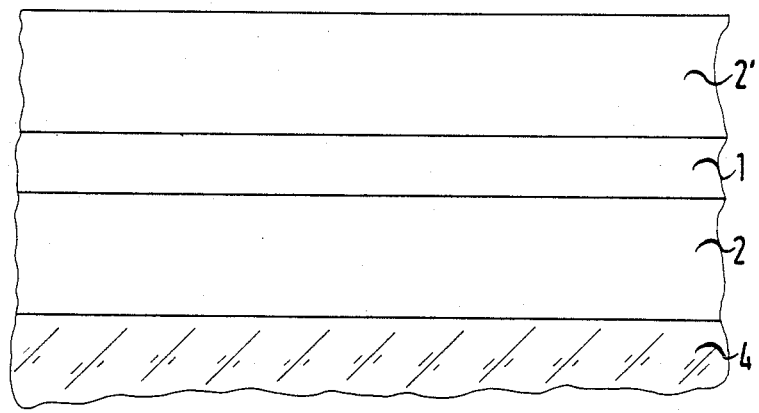
FIG. 1 is a vertical cross-section through the light-guiding layers of the optical waveguide of the invention prior to formation of the light-guiding strip waveguides.

A first cladding layer 2 from pure $SiO_2$ is coated onto a silica glass substrate 4 using a non-isothermal plasma CVD process (FIG. 1). A core layer 1 is then deposited on this first cladding layer 2; this core layer is made up of 85% by wt. $SiO_2$ and 15% by wt. $GeO_2$; the core layer therefore has a higher refractive index than the two homogeneous ones.

Figure 2:
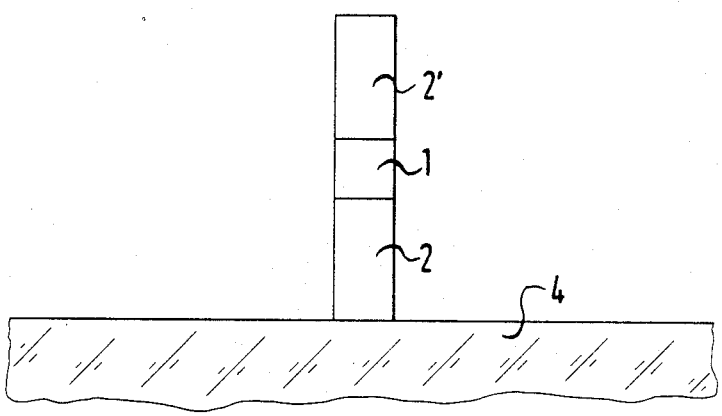
FIG. 2 represents a vertical cross-section through the light-guiding strip waveguide of the optical waveguide of the invention.
Figure 3:
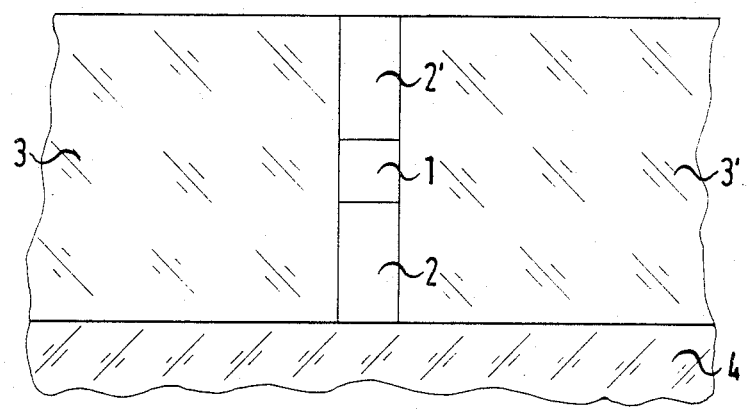
FIG. 3 is a vertical cross-section through the entire finished optical waveguide.

A further cladding layer 2' with the same composition as the first cladding layer 2 is deposited on the core layer 1. Accordingly the core layer 1 has a higher refractive index than the cladding layers 2 and 2' adjoining it. Using the conventional masking and etching technique described in detail in the relevant literature, a strip waveguide is then produced on the substrate 4 from the layer complex comprising the layers 2, 1, 2' (FIG. 2). In the next step of the process the two cladding region halves 3 and 3' ar deposited, directly adjoining the strip waveguide on both sides (FIG. 3). This entire cladding region comprising 3 and 3' has the composition 83.5% by wt. $SiO_2$, 15% by wt. $GeO_2$ and 1.5% by wt. $P_2O_5$; the cladding region therefore has approximately the same refractive index as the core region.

When the cladding region is applied, comprising the two halves 3 and 3' from the gas phase, there is again heating of the light-conducting strip waveguide produced beforehand. When the light-conducting strip waveguide and the two halves, 3 and 3', of the cladding region are subsequently jointly cooled, the stresses produced due to the different thermal coefficients of longitudinal expansion can be systematically controlled via the rate of cooling.

Because of the different thermal coefficients of longitudinal expansion of the cladding region (3, 3') of $15\times 10^{-7}/°$ C. and of the two similar cladding layers (2, 2') of $5\times 10^{-7}/°$ C. in present working example 1, controlled cooling causes greatly different stresses to build up in the core, parallel and perpendicular to the substrate 4; as a result stress-induced birefringence is produced in the core 1. In the core 1, which is dimensioned for single-mode transmission, two waves with mutually orthogonal planes of polarisation are then capable of propagation; the stress-induced birefringence means that these are largely decoupled.

In an optical waveguide of the type described above, a propagating wave whose plane of polarisation is parallel to the substrate 4 is not conducted and is thereby greatly attenuated, since the core 1 does not have a higher refractive index than the cladding region 3, 3'. Conversely, a wave whose plane of polarisation lies perpendicular to the substrate 4 is conducted, maintaining its plane of polarisation; owing to the stress-induced birefringence there can be no coupling into the position orthogonal thereto, in which coupling out from the core 1 would then occur.

A planar optical waveguide of this type therefore has a polarising effect. Because of the different thermal coefficients of longitudinal expansion of the glass compositions employed, in this type of optical waveguide a tensile stress ($\alpha_1 > \alpha_{2,2'}$) acts perpendicular to the substrate 4 on the core, and a compressive stress ($\alpha_{3,3'} > \alpha_1$) acts parallel to the substrate 4 on the core.

WORKING EXAMPLE 2

A planar optical waveguide is produced as in working example 1, except that for the cladding region 3, 3' a glass composition comprising 87% by wt. $SiO_2$ and 13% by wt. $B_2O_3$ is selected; accordingly the cladding region has a thermal coefficient of expansion of $13\times 10^{-7}/°$ C. and a lower refractive index than the core.

This choice of the thermal coefficients of expansion of the materials for the vitreous layers once again provides the stress-induced birefringence required to prevent coupling of the two propagation modes. Unlike the optical waveguide described in working example 1, this type of planar optical waveguide permits a wave with a plane of polarisation perpendicular or parallel, or even two waves with planes of polarisation perpendicular and parallel to the substrate 4, to be guided more or less attenuation-free while maintaining the respective planes of polarisation.

What is claimed is:

1. Process for producing a planar optical waveguide for guiding light with defined polarisation, comprising depositing thin vitreous layers from a gas phase on a substrate to produce a coating of given refractive index profile of the layers, thereby depositing a first cladding layer, thereafter a light-guiding core region, and onto the core region a second cladding layer with substantially the same composition as the first cladding layer, subsequently producing from said coating light-guiding strip waveguides by masking portions of said coating and then etching down to the substrate of the unmasked regions, and after the formation of these light-guiding strip waveguides, depositing a vitreous cladding region (3,3') adjoining these strip waveguides on both sides, wherein perpendicular to the substrate surface the height dimensions of the cladding region (3,3') and the light-guiding strip waveguide are roughly equal and coextensive, and the thermal coefficient of longitudinal expansion of the cladding region (3,3') is markedly different from the thermal coefficient of longitudinal expansion of the two cladding layers (2, 2') the difference being such that stress-induced light-polarization is provided for light waves traveling through the strip wave guides, the polarization being preferential either to waves traveling parallel to the substrate or to waves traveling perpendicular to the substrate.

2. The process according to claim 1, wherein the cladding layers (2, 2') and the cladding region (3, 3') are constituted from materials both exhibiting a lower refractive index than the core region (1).

3. The process according to claim 1, wherein either the cladding layers (2, 2') are or the cladding region (3,3') is constituted from a material exhibiting roughly the same refractive index as the core region (1).

4. The process according to claim 1, wherein the deposition of the vitreous layers is carried out using a non-isothermal plasma CVD process.

5. The process according to claim 1, wherein the core region (1), the cladding layers (2, 2') and the cladding region (3, 3') are constituted from oxide glasses.

6. The process according to claim 1, wherein the core region (1), the cladding layers (2, 2') and the cladding region (3, 3') are constituted from fluoride glasses.

7. The process according to claim 1, wherein the core region (1), the cladding layers (2, 2') and the cladding region (3, 3') are constituted from chalcogenide glasses.

8. The process according to claim 1, wherein silica glass is used as the material for the substrate (4).

9. The process according to claim 1, wherein the thickness of the cladding layer (2) between the substrate (4) and the core region (1) is so selected that propagating light cannot interact with the substrate.

* * * * *